US007900133B2

(12) United States Patent
Cragun et al.

(10) Patent No.: US 7,900,133 B2
(45) Date of Patent: Mar. 1, 2011

(54) ANNOTATION STRUCTURE TYPE DETERMINATION

(75) Inventors: Brian J. Cragun, Rochester, MN (US); Christine A. Grev, Rochester, MN (US); Cale T. Rath, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 2061 days.

(21) Appl. No.: 10/731,080

(22) Filed: Dec. 9, 2003

(65) Prior Publication Data

US 2005/0125716 A1 Jun. 9, 2005

(51) Int. Cl.
*G06F 17/00* (2006.01)

(52) U.S. Cl. .......... 715/230; 715/231; 715/233; 715/234

(58) Field of Classification Search .................. 715/512, 715/230, 231, 233, 234
See application file for complete search history.

(56) References Cited

U.S. PATENT DOCUMENTS

| | | | | |
|---|---|---|---|---|
| 6,519,603 | B1 * | 2/2003 | Bays et al. | 707/102 |
| 6,665,681 | B1 * | 12/2003 | Vogel | 707/101 |
| 6,956,593 | B1 * | 10/2005 | Gupta et al. | 715/751 |
| 2003/0018632 | A1 * | 1/2003 | Bays et al. | 707/3 |
| 2003/0074375 | A1 * | 4/2003 | Nakamura et al. | 707/200 |
| 2004/0205514 | A1 * | 10/2004 | Sommerer et al. | 715/501.1 |

OTHER PUBLICATIONS

Dettinger et al., IBM U.S. Appl. No. 10/083,075, filed Feb. 26, 2002, “Application Portability and Extensibility Through Database Schema and Query Abstraction”.
Chatterjee et al., IBM U.S. Appl. No. 10/600,014, filed Jun. 20, 2003, “Universal Annotation Management System”.

* cited by examiner

*Primary Examiner* — Stephen S Hong
*Assistant Examiner* — Matthew J Ludwig
(74) *Attorney, Agent, or Firm* — Patterson & Sheridan, LLP

(57) ABSTRACT

Methods, systems, and articles of manufacture for organizing and selecting structures used to generate forms for capturing information as annotations made for a variety of different type data objects are provided. Some embodiments allow annotation structures to be associated with specific pairings of data object types and user roles via entries in a configuration file. When a user selects a set of one or more data objects for annotation, the configuration file may be accessed to determine a proper annotation structure for use in generating an annotation form based on the selected data objects and a role of the user.

4 Claims, 14 Drawing Sheets

460

| Data Source Type | Point Type | Meta Information |
|---|---|---|
| Relational (and Excel) | Table | Table Name |
| | Column | Table Name, Column Name |
| | Cell | Table Name, Key, Column Name |
| | Row | Table Name, Key |
| Word Document/HTML file | Document | Path |
| | Word Range | Path, Start character, End character |
| Spotfire File | Spot | Context, View, Marked Record, Column |
| | Cluster | Context, View, Marked Record, Column |
| | Row | Context, View, Marked Record |
| | Column | Context, View, Column |
| | File | Context, View |
| Pdf<br>(requires Adobe Framemaker) | Text | Page, Start word,<br>End word, Start of set, End of set |
| | Graphic | Page, Top, Left, Bottom, Right |

*FIG. 4C*

Patent_Draft. V1

FORM: DEFAULT

DEFAULT DATA OR DESCRIPTION:

Quality:
- ☐ Good
- ☐ Acceptable  ← 812B
- ☑ Marginal
- ☐ Poor

Keywords:

Comments: [814B]

810B

---

Patent_Draft. V1

FORM: INVENTOR FEEDBACK

DEADLINE 01/01/01

FEEDBACK

Status:
- ☐ Good
- ☑ Acceptable  ← 812C
- ☐ Needs Revision
- ☐ Needs More Info

Patent Attorney: C. Moore
Inventor: A. Smith

Inventor Comments: [814C]

810C

ANNOTATION STRUCTURE TYPE DETERMINATION

CROSS-REFERENCE TO RELATED APPLICATIONS

The present application is related to commonly-owned U.S. Pat. No. 6,519,603 issued Feb. 11, 2003, entitled "Method And System For Organizing An Annotation Structure And For Querying Data And Annotations", commonly-owned, co-pending application Ser. No. 10/083,075 filed Feb. 26, 2002, now U.S. Pat. No. 6,996,558 issued Feb. 7, 2006, entitled "Application Portability And Extensibility Through Database Schema And Query Abstraction," and commonly owned, co-pending application Ser. No. 10/600,014 filed Dec. 23, 2004, now pending, entitled "Universal Annotation Management System", which are herein incorporated by reference in their entirety as if completely set forth herein below.

BACKGROUND OF THE INVENTION

1. Field of the Invention

The present invention relates to the field of data entry and retrieval and, more particularly, to a method and system for use in annotating a variety of heterogeneous data object types.

2. Description of the Related Art

There are well known methods for capturing and storing explicit knowledge as data, for example, in relational databases, documents, flat files, and various proprietary formats in binary files. Often, such data is analyzed by various parties (e.g., experts, technicians, managers, etc.), resulting in rich interpretive information, commonly referred to as tacit knowledge. However, such tacit knowledge is often only temporarily captured, for example, as cryptic notes in a lab notebook, discussions/conversations, presentations, instant messaging exchanges, e-mails and the like. Because this tacit knowledge is typically not captured in the application environment in which the related data is viewed and analyzed, it is often lost.

One approach to more permanently capture tacit knowledge is to create annotations containing descriptive information about data objects. Virtually any identifiable type of object may be annotated, such as a matrix of data (e.g., a spreadsheet or database table), a text document, or an image. Further, subportions of objects (sub-objects) may be annotated, such as a cell, row, or column in a database table or a section, paragraph, or word in a text document. An indexing scheme is typically used to map each annotation to the annotated data object or sub-object, based on identifying information, typically in the form of an index. The index should provide enough specificity to allow the indexing scheme to locate the annotated data object (or sub-object). Further, to be effective, the indexing scheme should work both ways: given an index, the indexing scheme must be able to locate the annotated data object and, given an object, the indexing scheme must be able to calculate the index for use in classification, comparison, and searching (e.g., to search for annotations for a given data object).

However, a number of challenges are presented when annotations must be made for objects from a variety of different type (i.e., heterogeneous) data sources manipulated by a variety of different application programs, which is a fairly common scenario in modern business enterprises. For example, in a biomedical enterprise, annotations may need to reference text documents (manipulated by a word processor/text editor), experimental data (manipulated by a database or spreadsheet application), genomic data (manipulated by a specialized application), images (manipulated by an image viewing application), and the like.

One challenge is that different types of annotations (i.e., containing different types of information) may be made depending on the type of data object being annotated. Using the examples above, annotations made on portions of a text document may include comments on the text, annotations made on experimental or genomic data may contain information regarding how the data was gathered, validity, or significance of the data. One approach to accommodate the entry of such a diverse group of annotations is to create annotation structures that each contains a set of fields corresponding to the information to be contained in a corresponding annotation. When a user selects a certain type of data object to be annotated, the user may be presented with an interface for entering annotation information based on fields contained in an annotation structure corresponding to selected type of data object.

The type of information contained in annotations may also differ depending on a role of the user creating the annotation and/or a role of the user expected to view the annotation. As an example, technicians, researchers, and managers may all be interested in different types of information (e.g., technicians with equipment used, researchers with the significance of the data gathered, and managers with the progress of a project). Further, certain information may only be available to users acting in a role having a given level of authority.

To accommodate different users, annotation structures may be created that correspond not only to a given type of data object, but also to a given user's role. However, given the many different types of data objects that may be annotated and that users may function in many different types of roles, there may be a large number of different combinations of data types and user roles. As a result, organizing and selecting a proper type of annotation structure for each different combination may present a challenge.

Accordingly, there is a need for methods and systems for organizing and selecting annotation structures corresponding to different combinations of data types and user roles.

SUMMARY OF THE INVENTION

The present invention generally is directed to methods, systems, and articles of manufacture for organizing and selecting annotation structures corresponding to different combinations of data types and user roles.

One embodiment provides a method for selecting an annotation structure for use in generating a form for entering annotation data. The method generally includes receiving a request from a user to create an annotation for at least one data object identified by a set of identifying parameters and retrieving, from a configuration file, information identifying at least one annotation structure associated with the at least one data object based, at least in part, on the set of identifying parameters, the annotation structure defining one or more annotation fields.

Another embodiment provides a method for annotating a set of disparate data points. The method generally includes receiving a request from a user to create an annotation for a specified set of data points, determining if the data points are of the same type, if the data points are not of the same type, retrieving, from a configuration file, at least one annotation structure associated with a set of data points of the same types as the specified set of data points, and generating, based on the annotation structure, an interface for entering annotation information to be associated with the specified set of data points.

Another embodiment provides a computer-readable medium containing an executable component for selecting an annotation structure for use in generating a form for entering annotation data. When executed by a processor, the executable component performs operations generally including receiving a request from a user to create an annotation for at least one data point identified by a set of identifying parameters and retrieving, from a configuration file, information identifying at least one annotation structure associated with the at least one data point based, at least in part, on the set of identifying parameters, wherein the annotation structure defines one or more annotation fields.

Another embodiment provides a system for creating annotations for data points contained in one or more different type data sources generally including a set of annotation structures, each specifying one or more annotation fields, at least one configuration file associating annotation structures with sets of one or more annotatable data points, and an annotation server. The annotation server is generally configured to receive a request from a user to create an annotation for at least one data point identified by a set of identifying parameters and retrieve, from the configuration file, information identifying at least one annotation structure associated with the at least one data point based on the set of identifying parameters and a role of the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4C is a table listing exemplary data sources and annotatable data points, according to one embodiment of the present invention.

DETAILED DESCRIPTION OF THE PREFERRED EMBODIMENTS

Figure 1:
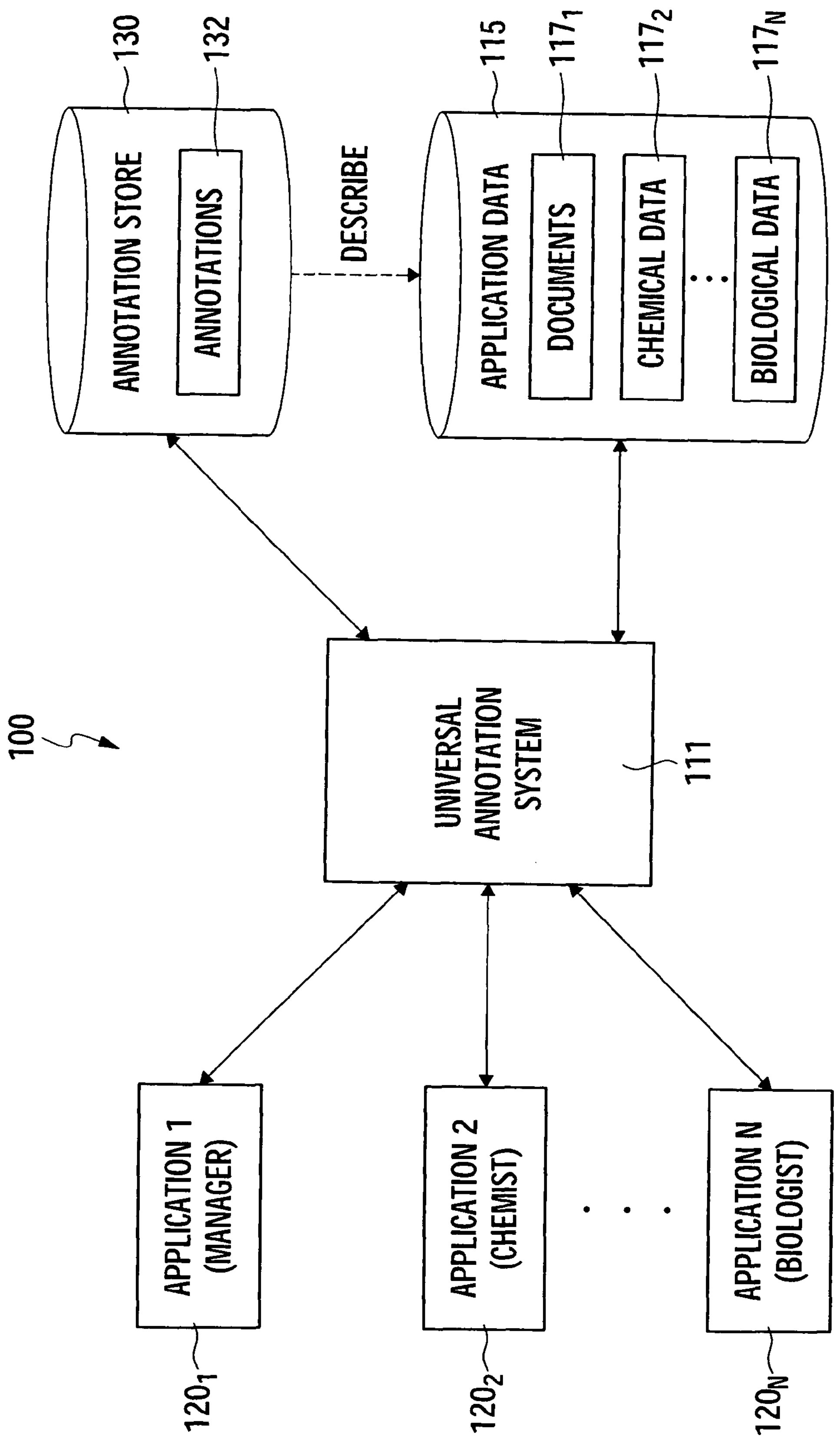
FIG. 1 is an exemplary computing environment in which embodiments of the present invention may be utilized.

Embodiments of the present invention provide methods, systems, and articles of manufacture that may be used to organize and select structures used to generate forms for capturing information as annotations for a variety of different type data objects. Some embodiments allow annotation structures to be associated with specific pairings of data object types and user roles via entries in a configuration file. When a user selects a set of one or more data objects for annotation, the configuration file may be accessed to determine a proper annotation structure for use in generating an annotation form based on the selected data objects and a role of the user. Embodiments of the present invention allow an annotation structure to be associated with data objects of the same type, data objects of different types, data objects from a common data source, or data objects from different data sources (i.e., disparate data objects).

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of reference to a data object.

Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

FIG. 1 illustrates an exemplary enterprise system 100 in which a universal annotation system 111 in accordance with the present invention may be utilized to exchange information, captured in the form of annotations 132, between users collaborating on a project. For some embodiments, the annotation system 100 may be similar in operation to an annotation system described in the commonly owned, co-pending application 10/600,014, entitled "Universal Annotation Management System." The universal annotation system 111 may be provided to members of such an industry, for example, from a service provider in the business of installing such systems. In an effort to ensure successful deployment of the annotation system, the service provider may address both the capture and harvest (retrieval) of tacit knowledge in the form of annotations 132. The capture process generally involves users (e.g., people or, in some cases, application programs) entering annotation content about some item of "target" data.

As previously described, the target data may be of any suitable type, such as textual or tabular (structured, usually non-textual), graphical, or any other type maintained in any type data source, such as a text document, flow diagram, schematic (e.g., electrical or mechanical) or any multimedia file (e.g, an audio file, image file, or video clip). During the capture process, the user entering the annotation content will typically be interacting with software that could be either embedded within their particular scientific applications (e.g., as a plug-in component) or, alternatively, with a separate annotation application that is external to their scientific applications, for example, a stand-alone browser. The annotations 132 may be stored in a central annotation repository (e.g., an annotation store 130), which may be searched independently or in conjunction with the annotated data, thus allowing users to harvest knowledge captured by other users about the data of interest.

For example, the annotations 132 may capture insights of different users, such as a manager, chemist, and biologist, working an a biomedical enterprise. The annotations 132 may include annotations that describe various type data objects contained in various data sources, such as documents $\mathbf{117}_1$ (e.g., project status reports) generated by the manager with a first application $\mathbf{120}_1$ (e.g., a word processor), chemical data $\mathbf{117}_2$ manipulated (e.g., created/viewed/edited) by the chemist with a second application $\mathbf{120}_2$ (e.g., a database application), and biological data $\mathbf{117}_N$ (e.g., genomic data) generated by a biologist with an $N^{th}$ application $\mathbf{120}_N$ (e.g., a database application or specialized genomic data application).

Storing the annotations 132 in the annotation store 130 may allow tacit knowledge to be captured about the data without modifying the data sources containing the data. It should be understood, however, that the annotation store 130 may actually reside on the same system as the annotated data sources. In either case, the various application data 115 are enhanced with the opinions and evaluations of experts (e.g., chemists, biologists, and managers), and this supplementary knowledge is made available to others via the annotation system 111.

Figure 2:
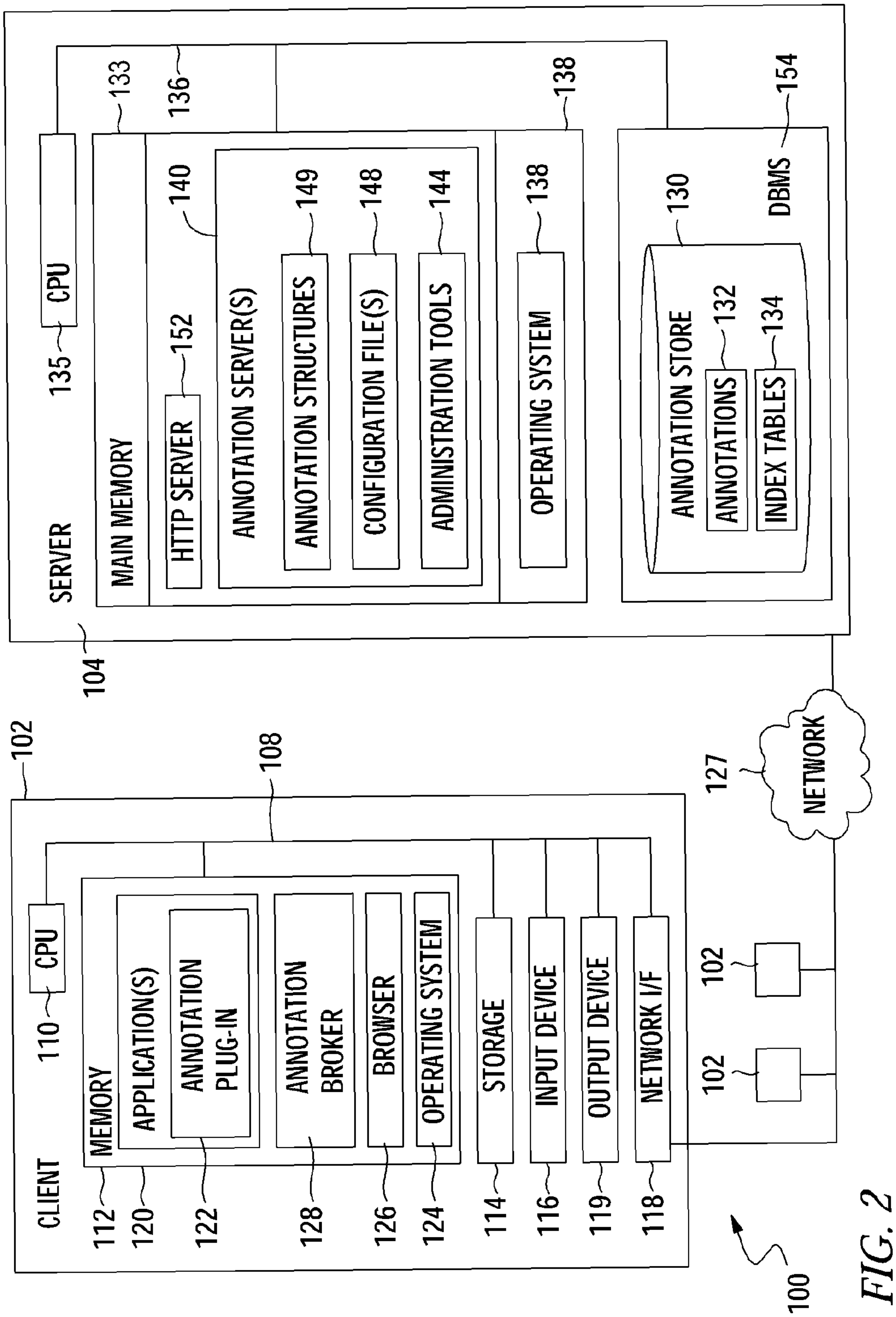
FIG. 2 is a client server view of one embodiment of the computing environment of FIG. 1.

Referring now to FIG. 2, a client-server view of one embodiment of the enterprise system 100 is shown. As illustrated, the system 100 generally includes one or more client computers 102 (e.g., user workstations) generally configured to access annotations 132 in an annotation store 130, via the annotation server 140 (e.g., a software component) running on at least one server computer 104. The client computers 102 and server computer may be connected via a network 127. In general, the network 127 may be any combination of a local area network (LAN), a wide area network (WAN), wireless network, or any other suitable type network, including the Internet.

As illustrated, the client computers 102 generally include a Central Processing Unit (CPU) 110 connected via a bus 108 to a memory 112, storage 114, input devices 116, output devices 119, and a network interface device 118. The input devices 116 may be any devices to give input to the client computer 102, such as a mouse, keyboard, keypad, light-pen, touch-screen, track-ball, or speech recognition unit, audio/video player, and the like. The output devices 119 may be any suitable devices to give output to the user, including speakers and any of various types of display screen. Although shown separately from the input device 116, the output device 119 and input device 116 could be combined (e.g., a display screen with an integrated touch-screen.

The network interface device 118 may be any entry/exit device configured to allow network communications between the client computer 102 and the server computer 104 via the network 127. For example, the network interface device 118 may be a network adapter or other network interface card (NIC). Storage 114 is preferably a Direct Access Storage Device (DASD). Although shown as a single unit, storage 114 may be any combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips. Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing at least one application 120 (optionally shown with an associated annotation plug-in 122 and an annotation broker 128). The application 120 may be any of a variety of applications used to manipulate (e.g., create, view, and/or edit) data that may be annotated. For example, the application 120 may be a text editor/word processor used to manipulate annotatable documents, a database application or spreadsheet used to manipulate data, a document generator/viewer (such as Adobe's Acrobat® and Acrobat Reader) used to manipulate documents, or data analysis software, such as Decision Site available from Spotfire, Inc., imaging software used to manipulate images, and any other types of applications used to manipulate various types and forms of data.

Some application programs 120 may be configured to communicate with the annotation server 140 directly, for example, via a set of application programming interface (API) functions (not shown) provided for the annotation server 140. As used herein, the term API generally refers to any set of interface functions (e.g., implementing any suitable inter-process protocol) that may be used to communicate between a client computer or process and a server computer or process. Other application programs, however, may communicate with the annotation server 140 via plug-in components 122 and/or the annotation broker 128 (e.g. also via API functions). In other words, annotation capability may be added to an existing application 120 via the plug-in components 122. The plug-in components 122 may, for example, present graphical user interface (GUI) screens to users of applications 120, thus allowing the creation and retrieval of annotations from within the applications used to manipulate the annotated data.

The annotation broker 128 is an optional component and may be implemented as a software component configured to present a standard interface to the Annotation Server 140 from various applications 120, for example, communicating with plug-in components 122 from multiple applications running on the same client computer 102. Hence, the annotation broker 128 may provide a degree of separation between the applications 120 and the annotation server 140, hiding detailed operation of the annotation server 140 and facilitating development of plug-in components 122. In other words, new applications 120 may be supported through the development of plug-in components 122 written in accordance with the annotation broker interface.

Components of the server computer 104 may be physically arranged in a manner similar to those of the client computer 102. For example, the server computer 104 is shown generally comprising a CPU 135, a memory 133, and a storage device 154, coupled to one another by a bus 136, which may all functions as similar components described with reference to the client computer 102. The server computer 104 is generally under the control of an operating system 138 (e.g., IBM OS/400®, UNIX, Microsoft Windows®, and the like) shown residing in memory 133.

As illustrated, the server computer 104 may be configured with the annotation server 140, also shown residing in memory 133. The annotation server 140 provides annotation clients (e.g., running on one or more client computers 102) with access to the annotation store 130, for example, via annotation API functions. In other words, the annotation API functions generally define the interface between annotation clients and the annotation server 140. As used herein, the term annotation client generally refers to any user interface (or other type front-end logic) of the annotation system that communicates with the annotation server to manipulate (e.g., create, update, read and query) annotation data. Examples of annotation clients include applications 120 communicating with the annotation server 140 (directly, or via plug-in components 122) and an annotation browser 126.

As will be described in greater detail below, the annotation server 140 may be configured to perform a variety of operations, such as responding to requests to create annotations for specified data objects, formulating and issuing queries against the annotation store 130 to search for annotations for a specified data object, and formulating and issuing queries against the annotation store 130 to search for annotations satisfying one or more specified conditions (e.g., having a specified author, creation date, content, and the like).

For some embodiments, a distributed annotation system for an enterprise may comprise a plurality of distributed annotation servers 140, for example, each running on a different server computer 104. Each distributed annotation server 140 may support a different set of users (e.g., different departments, or even different geographic locations, within a common enterprise or separate enterprises, etc.), and may maintain a separate annotation store 130. However, each distributed annotation server 140 may be configured to access annotation content from annotation stores 130 maintained by other annotation servers 140 (e.g., directly, or through communication with the corresponding maintaining annotation servers 140), thus allowing annotations to be created and shared by a wide range of users throughout a distributed enterprise.

For some embodiments, the annotation server 140, and various related components, may be configured via a set of administrative tools 144. For example, the tools 144 may be used to generate configuration data 145 accessed by the annotation server 140. As illustrated, the configuration data 145 may include various configuration files 148, a data source definition file 146 which may contain various information, such as identification of a set of annotation structures (or templates) 149 for use in displaying and collecting annotation information, the various annotatable data source types and indexing thereof, the roles in which users may operate, and other defining information which may affect operation of the annotation server 140. As will be described in greater detail below, the annotation structures 149 may contain a set of fields and groups of fields that determine what data is stored with the annotation and what data is presented to a user viewing the annotation, for example, based on the user's role.

A Relational View of the Annotation System

Figure 3:
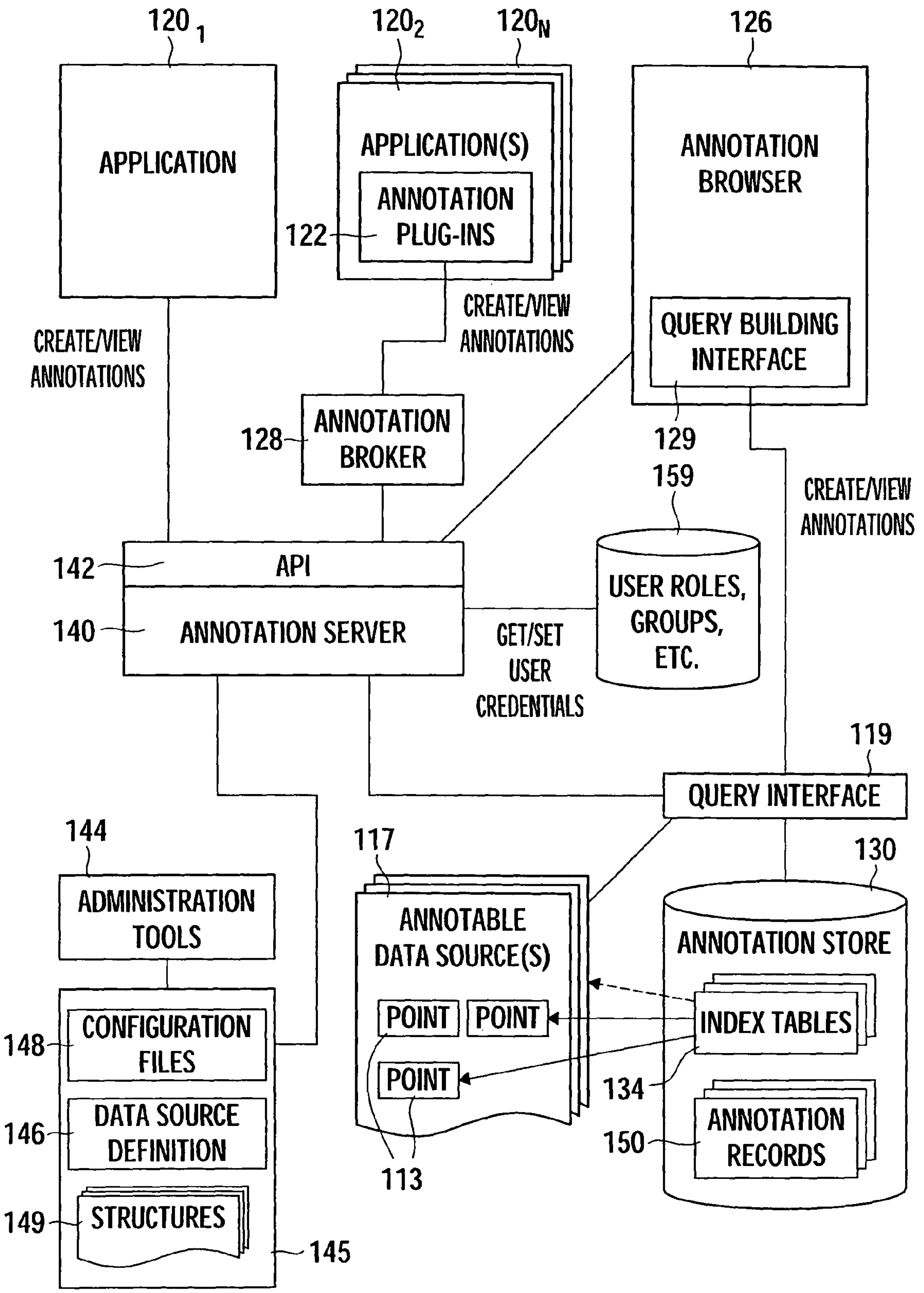
FIG. 3 is a relational view of an annotation system according to one embodiment of the present invention.

FIG. 3 illustrates a relational view of the annotation server 140 and various other components of the annotation system, in accordance with one embodiment of the present invention. As previously described, one or more applications 120 (e.g., residing on one or more client computers 102) may communicate with the annotation server 140 either directly (e.g., application $\mathbf{120_1}$) or via the annotation plug-ins 122 and/or annotation broker 128 (e.g., applications $\mathbf{120_2}$-$\mathbf{120_N}$), to create or view annotations for data object manipulated by the applications 120.

As illustrated, the annotation server 140 may issue queries against the annotation store 130 via a query interface 119. For some embodiments, the annotation server 140 may issue abstract queries against the annotation store 130 and the query interface 119 may be an abstract query interface configured to map logical fields of the abstract query to corresponding physical fields of the annotation store 130. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

As illustrated, the annotation broker 128 may serve as an interface between annotation plug-ins 122 for multiple applications and the annotation server 140. For example, the annotation broker 128 may manage messages sent to and from multiple annotation plug-ins and the annotation server (e.g., providing mediation between multiple plug-in components 122 trying to access the annotation server 140 simultaneously). For some embodiments, the annotation broker 128 may be implemented as a Windows Component Object Model (COM) server that provides a standard interface and facilitates access to the annotation server 140 for annotation plug-ins 122 for Windows applications (e.g., Microsoft Internet Explorer, Microsoft Word, Microsoft Excel, Adobe Acrobat, Spotfire, and other Windows applications). In other words, by providing a standard interface to the annotation server 140, the annotation broker 128 may facilitate extension of the annotation system to support new applications 120 through the development of plug-in components written in accordance with its interface.

As illustrated, an annotation browser 126 may allow the creation and viewing application data and annotations, independently of any of the applications 120. For some embodiments, the annotation browser 126 may provide a generalized web-based user interface for viewing structured data content (e.g. application source data that can be accessed directly through queries via the query interface 119), and for creating and viewing annotations on it. As will be described in greater detail below, for some embodiments, the annotation browser may provide an interface allowing a user to simultaneous query data sources 117 and associated annotations.

For some embodiments, in order to identify annotated data object(s), an index, or set of indexes, that may be used to identify the corresponding annotated data object(s) may be stored with the annotation data. As illustrated, an index obtained from an annotation record may be used to retrieve information from one or more index tables 134 that may be used to identify the annotated data object or sub-objects, commonly referred to as annotated points 113.

As used herein, the term point may generally refer to any identifiable data unit (or group of data units) capable of being annotated. Examples of annotatable points include, but are not limited to, database tables, rows, columns, cells, or groups of cells, selected portions of a text document (e.g., defined by an offset and length, start and stop locations, or any other suitable defining information), and the like. Multiple points in an object may be referenced by the same annotation and any point in an object may be referenced by multiple annotations. Further, as indicated by the dashed arrow from the index table 134 in FIG. 3, an annotation may reference points in more than one annotatable data source 117. For some embodiments, additional points may be associated with an annotation, for example, via the annotation API 142, in effect propagating the annotation to the additional points.

In some cases, annotations may also be created and managed that are not associated with any particular point. For example, such annotations may facilitate the capture of insights that are more general in nature than annotation made for specific annotatable points. However, the method and systems described herein may still be utilized to advantage to create, organize, and search such annotations. For example, as described herein with reference to "point-specific" annotations, such annotations may also be created and viewed using one or more annotation structures.

Upon retrieving an annotation record 150 from the annotation store, using the index stored therein, the object described by the annotation can be found from the information within the annotation record, and, conversely annotations for a given object can be looked up in the annotation store, based on an index generated from it's identifying information. Thus, the indexes provide the ability to find corresponding data from annotations and to find annotations associated with data. Because different type data objects have different identifying parameters (e.g., database entities may be identified by table, column and/or row values, while portions of text documents may be identified by an offset and length or start and stop values within the document, etc.) different indexing methods may be used depending on the type of the annotated data object.

Data sources are typically arranged as "granular" hierarchical structures of different "levels" of data objects, each of which may be annotated for different reasons. For example, a database table may be annotated to explain why it was created (its purpose), a database column may be annotated to clarify what type of data is stored therein, a database row may be annotated to comment on a particular set of data (e.g., all related to a common patient), while a database cell may be annotated to comment on the significance of a particular value stored therein (e.g., an alarmingly high test result). In general, higher level data objects may be identified by indexes with fewer column values than indexes for lower level data objects (which may be regarded as sub-objects of the higher level data objects). Examples of suitable techniques for indexing a variety of different type data objects are described in detail in a commonly owned co-pending application Ser. No. 10/600,382 now pending, entitled "Heterogeneous Multi-Level Extendable Indexing For General Purpose Annotation Systems," filed Jun. 20, 2003, hereby incorporated by reference.

Annotation System Configuration

Figure 4A:
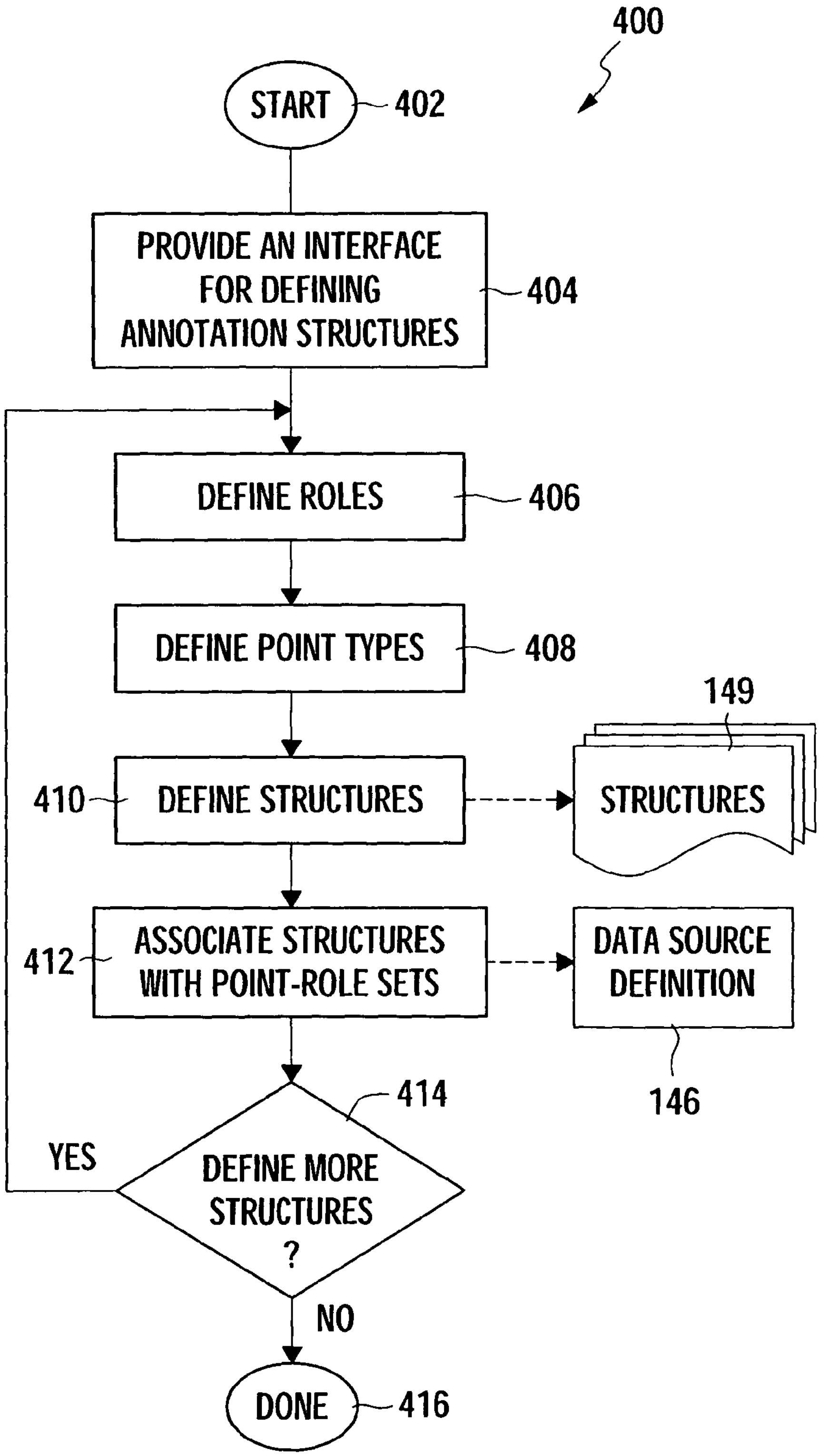
FIGS. 4A and 4B are flow charts illustrating exemplary operations for configuring an annotation system according to one embodiment of the present invention.

FIG. 4A illustrates exemplary operations 400 for configuring an annotation system that may be performed by a user, for example, using GUI screens provided by the administrative tools 144, to configure various components of the annotation system. For example, the administrative tools 144 may include a set of one or more application programs that provide a graphical user interface (GUI) that allows an administrator (generally defined as any user running the annotation tools 144) to navigate through the various configuration files 148, for example, to define roles, associate users with roles, define annotatable points for various data sources, and perform other type configuration operations, from a single interface.

Prior to performing the operations 400, however, the administrator may need to gather a variety of information used to determine how the annotation system should be configured (e.g., what data should be allowed to be annotated and what type of information should be captured as annotations). This data gathering may be considered a precursor to actually configuring the annotation system, for example, with the goal of limiting the annotation system to supporting annotations on data for which the annotations are likely to be beneficial. In case the administrator is not too familiar with the system in which the annotation system is to be deployed, a domain expert, as well as another type consultant (e.g., a service provider in the business of installing annotation systems), may be consulted to ensure proper considerations are taken prior to configuring the annotation system.

Figure 5A:
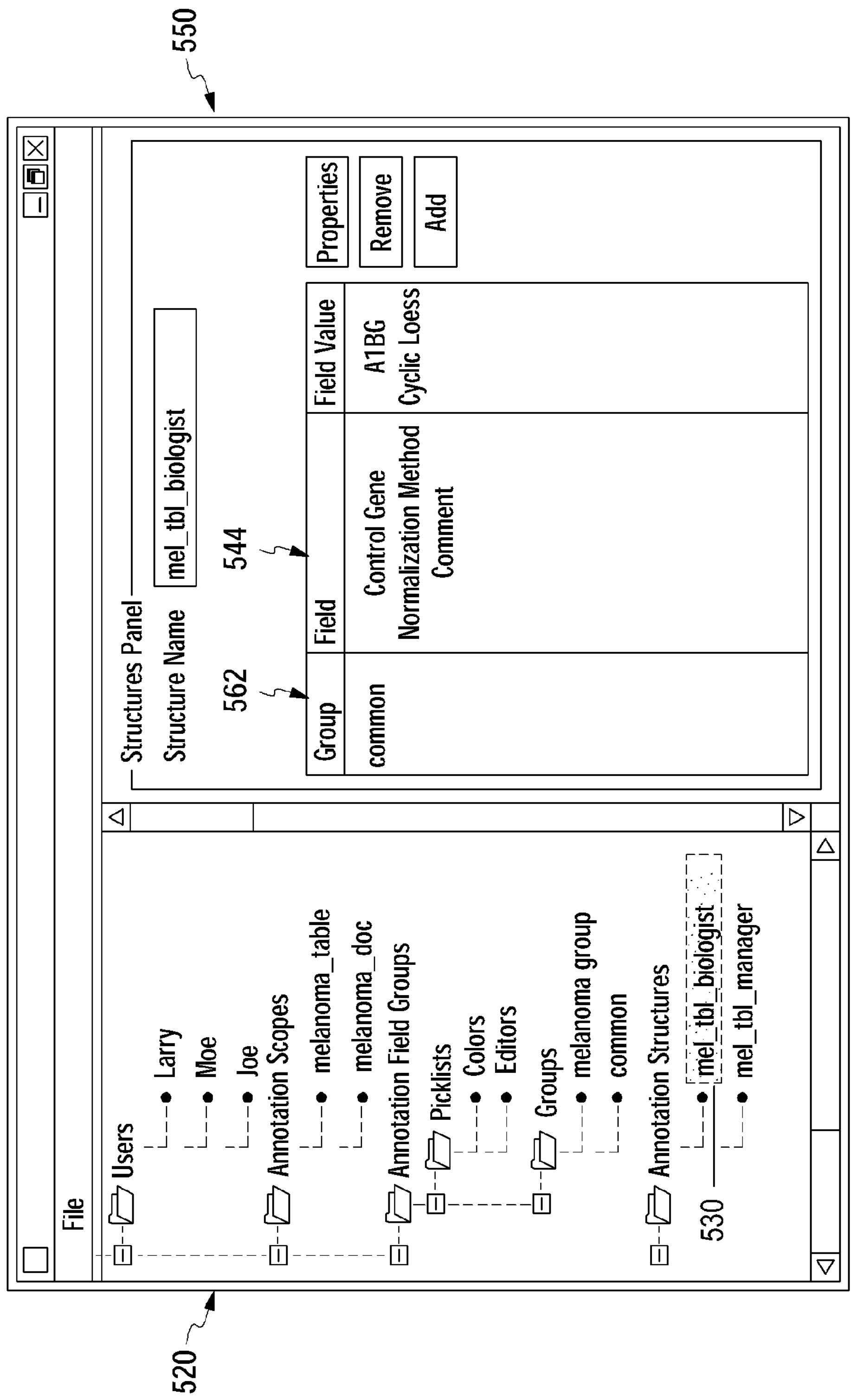
FIGS. 5A and 5B illustrate exemplary graphical user interface (GUI) screens that may be used to configure an annotation system according to one embodiment of the present invention.
Figure 5B:
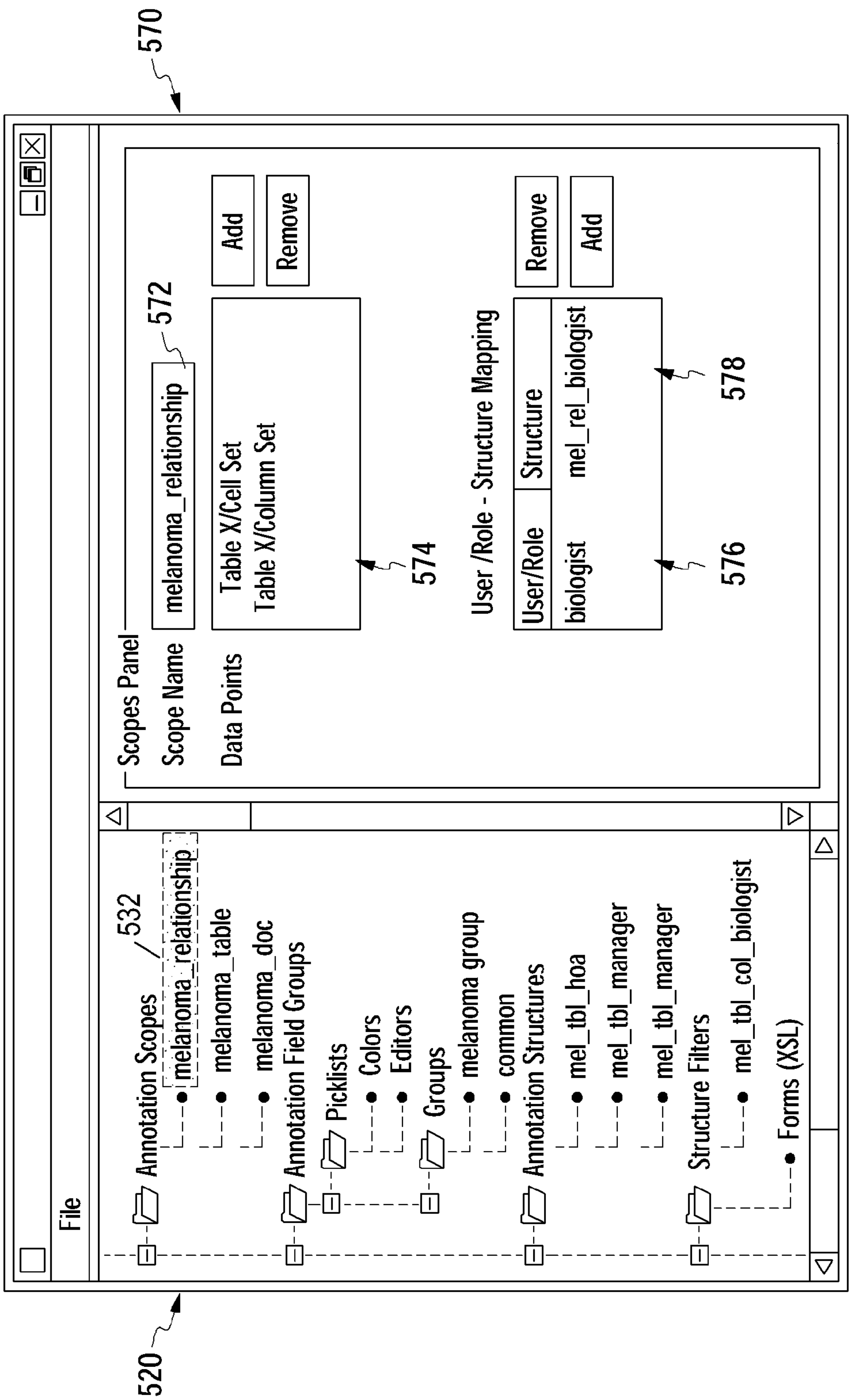

The operations 400 may be described with reference to FIGS. 5A-5B that illustrate exemplary GUI screens that may be presented to the user as part of the administrative tools 144. Of course, it should be understood that the details of the GUI screens are for illustrative purposes only and that the operations 400 represent just some of the types of operations that may be performed to configure the annotation system, and that a user may be able to perform various other configuration processes via the administrative tools 144 or through any other configuration interface.

The operations 400 begin at step 402, for example, upon invoking the administrative tools 144 and, at step 404, an interface is provided for defining annotation structures and other related information. The GUI screen of FIG. 5A illustrates one example of the type of interface that may be provided to the user. As illustrated, the GUI screen may include a configuration navigation panel 520 allowing the user to navigate through various configuration data structures (which may be implemented, in XML, as configuration files 148) organized in separate folders (e.g., Data Sources, Roles, Users, etc.). In response to selecting a given folder, the user may be presented with a GUI panel (shown opposite the navigation panel 520) corresponding to the selected folder.

A user may perform a loop of operations 406-412, for example, using the various GUI panels, to define annotation structures that may contain annotation fields selected to capture annotation information associated with a particular combination of data scope and defined user role.

At step 406, various roles (e.g., biologist, chemist, manager, etc.) are defined. For example, in response to selecting the Roles folder in the navigation panel 520, the user may be presented with a GUI panel 530 shown in FIG. 5A allowing a user to add new roles. The user may associate users with roles via a GUI panel 532 shown in FIG. 5B, which may be accessed by selecting a particular role in the navigation panel 520. As an alternative, roles may be associated with users via another similar GUI panel accessed by selecting a particular user in the navigation panel 520.

Figure 4B:
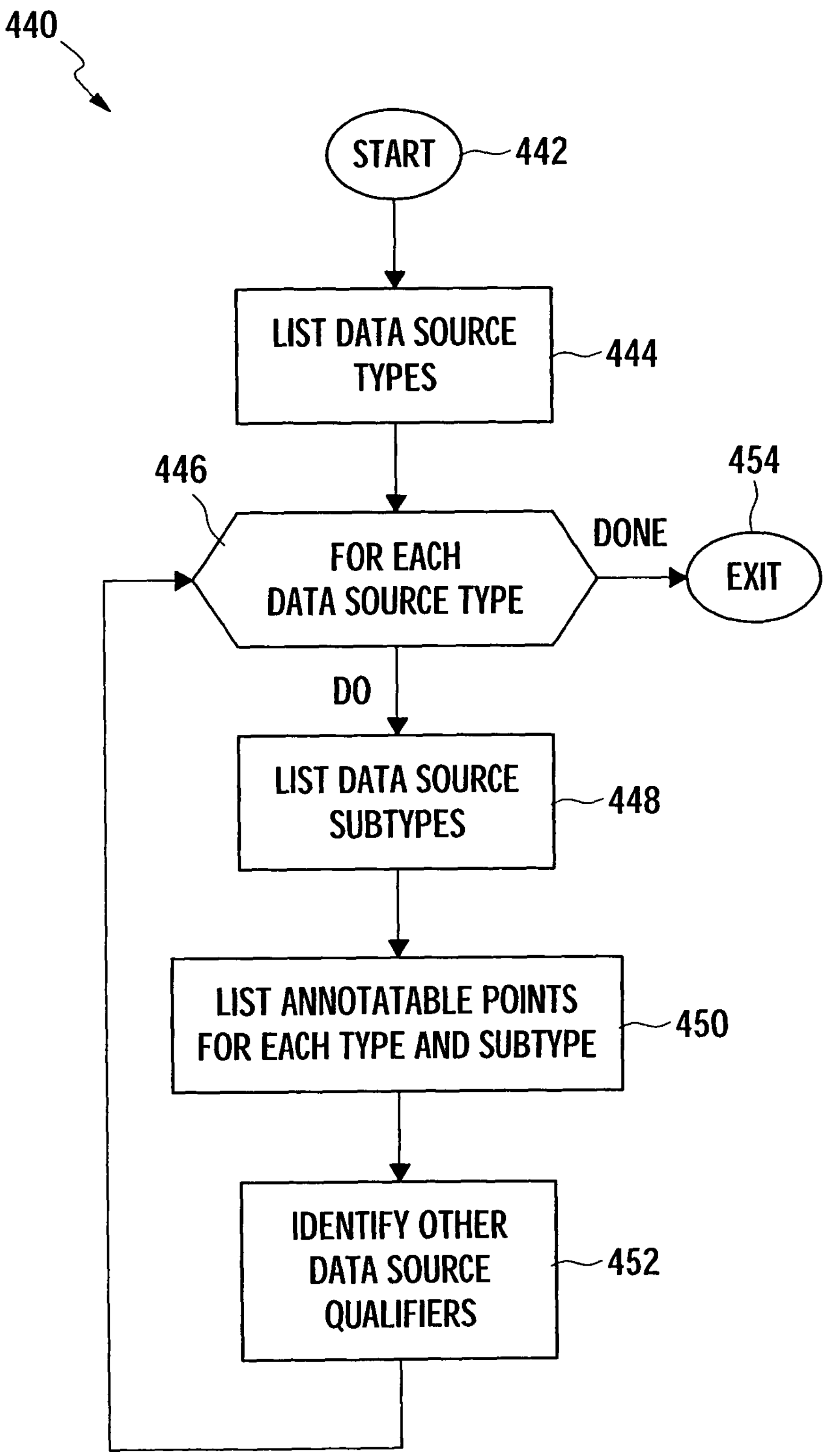

At step 408, point types (e.g., annotatable data objects and sub-objects of data sources) are defined. FIG. 4B illustrates exemplary operations 440 that may be performed to define annotatable data points. The operations 440 begin, at step 442 and, at step 444, available annotatable data sources are listed (e.g., database tables, spreadsheets, PDF documents, text documents, image files, or any type of identifiable data source). At step 446, a loop of operations (448-452) is entered to be performed for each of the listed data sources.

At step 448, data source subtypes are listed. Data source subtypes may be identified as cases where the content of a particular type of data source needs different type of metadata (captured in annotations) than other types. For example, for a database table, subtypes may include specific types of tables (e.g., a clinical data table, a personnel shift scheduling table, patient records, etc.), while for a text document, subtypes may include different types of documents (e.g., quality control documents, a resume, a patent application, etc.). As will be described in greater detail below, different annotation forms for use in creating annotations having different annotation fields may be presented to users, based on the data source subtype and selected point (and possibly a user role, as well).

At step 450, annotatable points for each type and subtype are listed. For example, as previously described, annotations for a database table may be made on a row, a column, a cell, or the entire table, while annotations for a text document may be made on the document or any section thereof (e.g., a group of words defined by a start character and stop character or offset and length).

At step 452, other data source qualifiers that further define an annotatable point (e.g., as an annotatable subpoint) are listed. Examples of other data source qualifiers for a particular scope, include the name of an annotatable entity, such as a particular column name. In other words, such a source qualifier may allow annotations of one column to be different than the annotations of another column. As another example of a data source qualifier, the content of an selected annotatable data object may be qualified, for example, to include a specified search string, one or more keywords, a particular value, set, or range of values, and the like.

FIG. 4C illustrates a table 460 that lists exemplary annotatable points for an exemplary set of data source types. Illustratively, the exemplary set of data source types includes relational data sources, such as database tables and spreadsheets, word documents, HTML files, Spotfire files, and PDF files. However, there is no limit to the data source types and annotatable points that may be supported, and the exact number and type supported may vary with different embodiments. The Meta Information column indicates information that may uniquely identify the corresponding annotatable point. While not shown, groups of more than one annotatable point may also be annotated.

For some embodiments, the annotatable points associated with any given data source may be defined via entries in the data source definition file 146 or some other configuration file. TABLE I below illustrates an exemplary portion (illustratively in XML format) of such entries for a relational data source (e.g., a relational database table). As illustrated, a set of allowable (or “permitted”) point properties may be specified that are used to specify a defined annotatable point. For example, a

TABLE I

ANNOTATABLE POINT DEFINITION EXAMPLE

```
001<DataSource shortType="relational">
002  <PermittedPointProperties>
003        <PointProperty name="PK" defaultType="string">
004        <PointProperty name="COL" defaultType="string">
005  </PermittedPointProperties>
006  <Point shortType="cell">
007        <PointProperty ref="PK">
008        <PointProperty ref="COL">
009  </Point>
010  <Point shortType="column">
011        <PointProperty ref="COL">
012  </Point>
013  <Point shortType="row">
014        <PointProperty ref="PK">
015  </Point>
016</DataSource>
```

row and column may be specified by a primary key (PK) and a column name (COL), respectively, while a cell may be specified by a primary key-column pair.

While not shown, for some embodiments, one or more restricted values may also be specified for each point property. An example of restricted values may be a set of column names for which annotations may be made, essentially limiting an annotatable point to those (e.g., columns or cells) identified by one of the listed column names. Such restricted values may be used explicitly (e.g., listing all allowable values) or implicitly (e.g., listing only prohibited values). Restricted values may also indicate one or more acceptable (or prohibited) values stored in an annotatable point (e.g., a text string or other type data value). As an example, for security or privacy reasons, cells containing certain values (e.g., a patient’s name) may not be annotated.

Referring back to FIG. 4A, at step 410, annotation structures 149 are defined, for example, by specifying available annotation fields to be included in the annotation structure. As previously described, the fields included in the annotation structure generally represent the metadata to be captured in the annotation. While not necessary, an annotation structure will typically include at least one field for entering comments. As illustrated in FIG. 5A, annotation structures may be defined via a structures panel 550 by adding annotation field groups 562, as well as additional, separate, annotation fields 544. The structures panel 550 may be selected, for example, via a navigation panel 520 allowing other configuration panels to be selected (e.g., for defining roles, annotatable points, and the like).

At step 412, structures are associated with annotatable point-role sets. As will be described in greater detail below, for some embodiments, annotation structures may be associated with point-role sets via entries in the data source definition 146. As illustrated in FIG. 5B, a scopes GUI panel 570 may allow users to associate a set of annotatable data points 574 (associated with a scope name 572) and one or more listed roles 576 with one or more listed annotation structures 578.

To illustrate the affect of this association, when a user acting in a specified role attempts to create an annotation on a specified data point, the user may be presented with an annotation form allowing a user to enter annotation information corresponding to the annotation fields contained in the associated annotation structure. For example, while engaged in the process of conducting melanoma research, a biologist (e.g., a user acting in the role of a biologist) creating an annotation for a cell or column of a database Table X may be presented with a form for entering data for annotation fields included in the annotation structure 578 mel_rel_biologist. If more than one annotation structure were associated with the selected data scope and role of biologist, the user may have been presented with a list of annotation structures that best fit what the user was trying to annotate. The user may then be prompted to select one of the annotation structures from the list for use in creating the annotation.

If more annotation structures are to be defined, as determined at step 414, the operations 406-412 may be repeated, otherwise, the operations 400 are exited at step 416. It should be noted that more than one annotation structure may be associated with a particular role-point combination. Further, a particular annotation structure may be associated with more than one particular role-point combination. Further, various data structures may be employed to associated annotation structures with annotatable point-role sets. For example, the data source definition file 146 may be populated with entries that indicate (e.g., via a structure ID) a particular annotation structure 149 that should be used when a user operating in a certain role attempts to create an annotation for a specified data object (point).

Associating Annotating Structures with Point-Role Sets

As previously described, annotations may be created for a single point or a set of multiple points which may be the same or disparate (e.g., different types and/or from different data sources). If a set of selected points are all of the same type, one or more annotation structures associated with that type may be used to create annotations for the selected points. For some embodiments, the association of annotation structures to an annotatable point-role pair for may be performed via entries in the data source definition file 146 or some other configuration file (e.g., as with the annotatable point definitions described above).

Such an entry for a single point type is referred to herein as a “point map,” while such an entry for a set of disparate points is referred to herein as a “disparate point set map.” TABLE II below illustrates an exemplary portion (illustratively in XML format) of a point map for a cell of a relational data source (e.g., a relational database table). As illustrated, the point map may include an identification of a data source,

TABLE II

ANNOTATABLE POINT MAP EXAMPLE

```
001<PointMap name=”Relational_Cell”>
002   <dataSource=”relational” point=”cell”>
003      <DefaultStructure id=”02FF” ref=”DefRelationalCell”>
004      <Role name=”scientist”>
005         <Structure id=”0756” ref=”SciRelationalCell”>
006      <Role>
007      <Role name=”manager”>
008         <Structure id=”0C59” ref=”MgrRelationalCell1”>
009         <Structure id=”0CD0” ref=”MgrRelationalCell2”>
010      <Role>
011<PointMap>
```

name of the annotatable point, and identification of a default structure that may be used, for example, when a user role is not given or does not match a specified user roles. For each specified role, one or multiple annotation structures associated with the point and that role may be identified (along with logical reference names). For example, as illustrated, more than one annotation structure may be associated with a manager role. As a result, when creating an annotation for this point, a user acting in a manager role may be presented with a list of available structures and asked to manually select with which structure their annotation should be created. While the structure IDs are illustratively shown as four digit (hexadecimal) numbers, structure IDs may take any suitable format and may include any suitable information (e.g., a URL or directory path) necessary to locate the identified structure.

TABLE III below illustrates an exemplary portion (illustratively in XML format) of a disparate point set map for a set of points that includes a combination of relational cells and Acrobat text. As illustrated, the disparate point set map may include a name and identification of a default structure. In order to identify the disparate points, the disparate point set map may refer to or define a point map for each disparate point.

TABLE III

ANNOTATABLE DISPARATE POINT SET MAP EXAMPLE

```
001<DPointSetMap name=”Rel_Row_and_Acrobat_text”>
002   <DefaultStructure id=”2A4D”>
003   <PointMap minOccurs=”2” maxOccurs=”unbounded”
004      dataSource=”relational” dsSubType=”row”>
005   <PointMap maxOccurs=”3”
006      dataSource=” acrobat” dsSubType=”GeneOntology”
007      point=”acrobat-text”>
008   <Role name=”Technician”>
009      <Structure id=”2D78” ref=”Acrobat+Cancer+Technician”>
010   <Role>
011<DPointSetMap>
```

As illustrated, each disparate point type may be specified by a data source (e.g., relational or acrobat) a subtype (e.g., GeneOntology as a specific type of acrobat file), and optionally a specified point (e.g., acrobat-text). Further, limitations may be placed on the quantity of each type of point in the disparate point set by specifying minimum and maximum values (minOccurs and maxOccurs, respectively). The absence of upper or lower limits may be specified explicitly (e.g., maxOccurs=“unbounded”) or implicitly (e.g., no specified minOccurs may imply minOccurs=1). In either case, the identified annotation structures may only be returned if the quantity of each type of the selected set of points falls within the corresponding specified range. For the illustrated example, at least two rows and no more than three Acrobat text points should be selected before the identified structures will be returned. In other words, if a technician selected two rows and two Acrobat text points for annotation, the specified structure identification ("2D78") will be returned, but not if the technician selected only a single row.

Creating Annotations

Figure 6A:
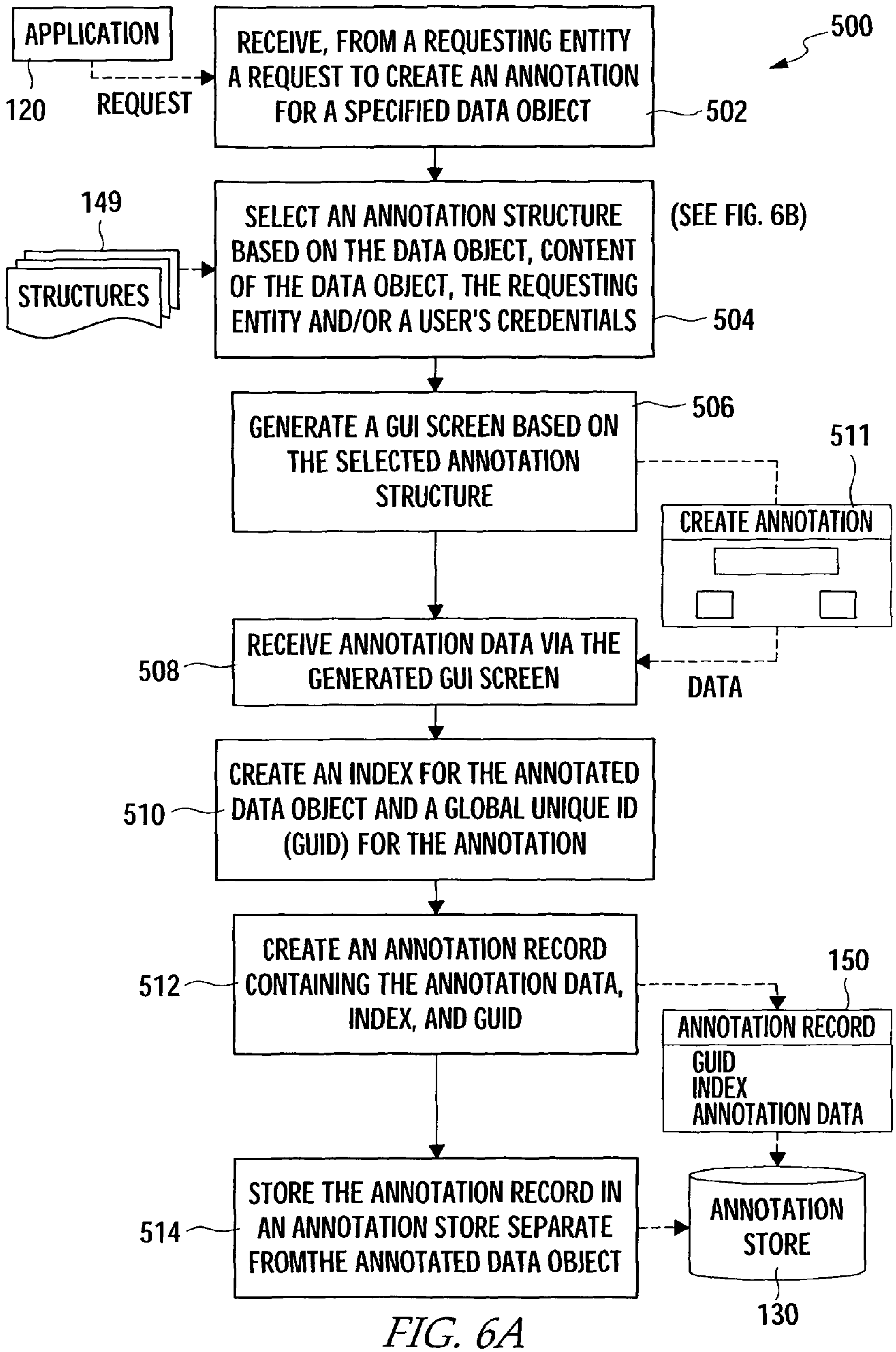
FIGS. 6A-6C are flow charts illustrating exemplary operations for creating annotations according to one embodiment of the present invention.

FIG. 6A illustrates exemplary operations 500 for creating annotations. While not shown, it may be assumed that a user's ID and/or role are known. For example, the user may have been required to log into the annotation system and a set of user credentials (e.g., including the user's role, security level, associate user group, or the like) may have been retrieved from a security database 159 containing such user credentials. As described above, the role selected by the user may then determine the annotation structures and, hence, the annotation forms presented to the user for creating annotations.

The operations 500 begin at step 502, by receiving, from a requesting entity (e.g., an individual user or application), a request to create an annotation for a specified data object. At step 504, an annotation structure 149 defining fields to be used in creating the annotation is selected based on at least one of a type/scope of the specified data object, content of the data object, the application from which the request is received, and a role (or other credential) of the user. As will be described in greater detail with reference to FIGS. 6B and 6C, for some embodiments a list of available structures may be obtained by searching the data source definition file 146 for a match on a point to be annotated and/or one or more user credentials (e.g., role, security level, user ID, member group, etc.).

Figure 7A:
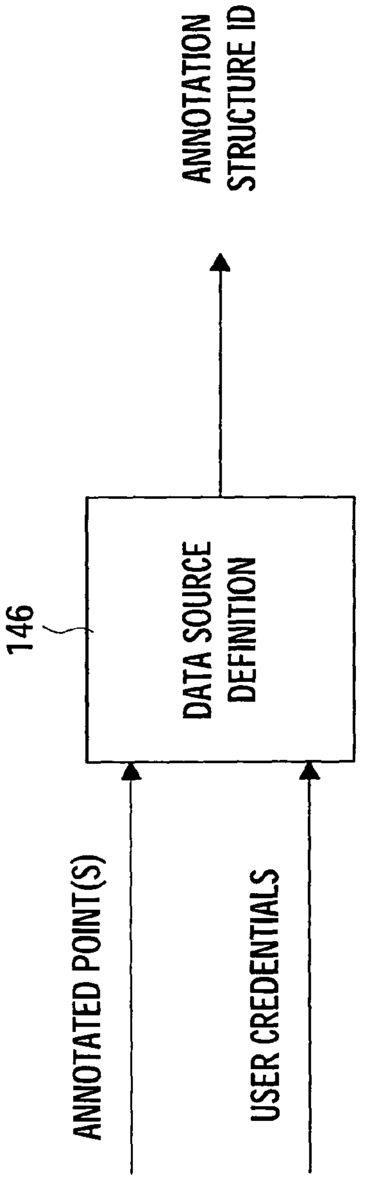
FIGS. 7A-7B illustrate exemplary components for selecting and transforming, respectively, annotation structures according to one embodiment of the present invention.
Figure 7B:
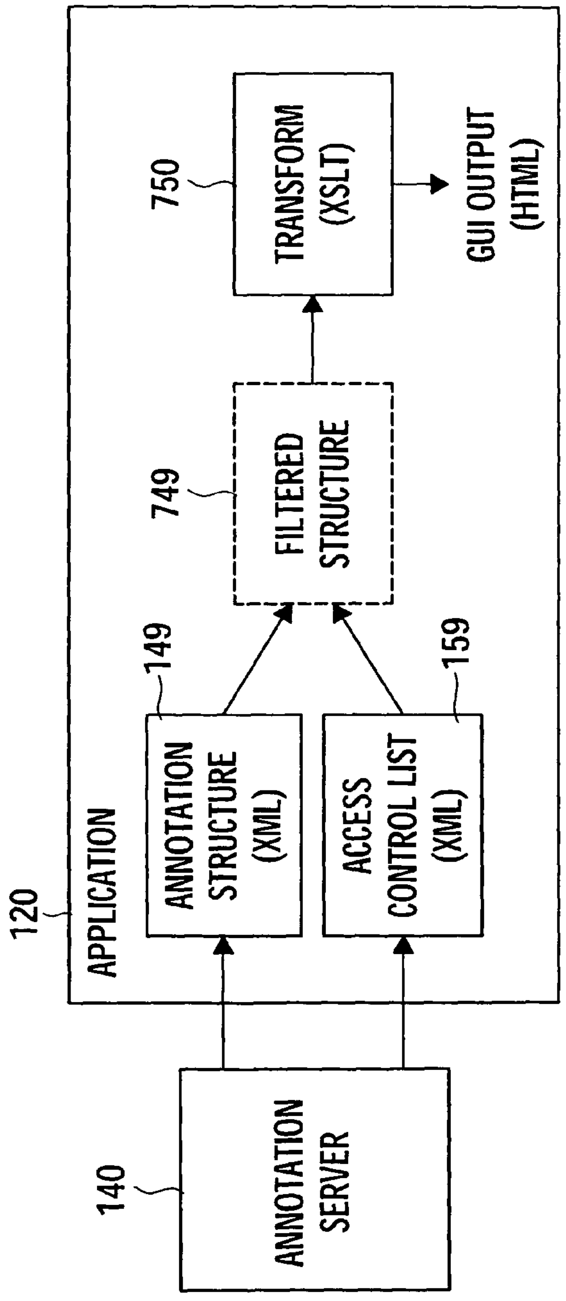

At step 506, a GUI screen is generated based on the selected annotation structure, for example, allowing a user to input data to the fields of the selected annotation structure. The GUI screen may be generated, for example, by transforming the annotation structure, based on one of a set of XSL transforms associated with a specified annotation structure. For example, as illustrated in FIG. 7B, for some embodiments, a filtered annotation structure 749 may be generated (e.g., within an application 120, plug-in component 122 thereof, or the annotation browser 128) based on the selected annotation structure 149 and an access control list (ACL) 159, which typically contains a list of userID's and/or groupID's with a common set of privileges to a protected resource, such as the annotation store 130. The filtered annotation structure 749 may have a limited subset of the fields contained in the selected annotation structure 149. The filtered annotation structure 749 may then be transformed (e.g., using a transform 750) to generate the final GUI displayed to the user.

At step 508, annotation data is received via the generated GUI screen. The annotation data may be stored in an annotation record 150. Each annotation record may contain "header" information common to all annotations, such as the annotation author, and a date/time stamp indicating when the annotation was made. Each annotation record 150 may also contain links to specialized annotation detail, specific to each type of annotation, a global unique identifier (GUID) uniquely identifying the annotation, as well as an index, which is used to locate the annotated object (and optionally a point within it). Therefore, at step 510, an index for the annotated data object and a GUID for the annotation are created. At step 512, an annotation record 150 is created containing the annotation data, index, and GUID. At step 514, the annotation record is stored in the annotation store 130, which may be separate from a store containing the annotated data.

Selecting Annotation Structures

Figure 6B:
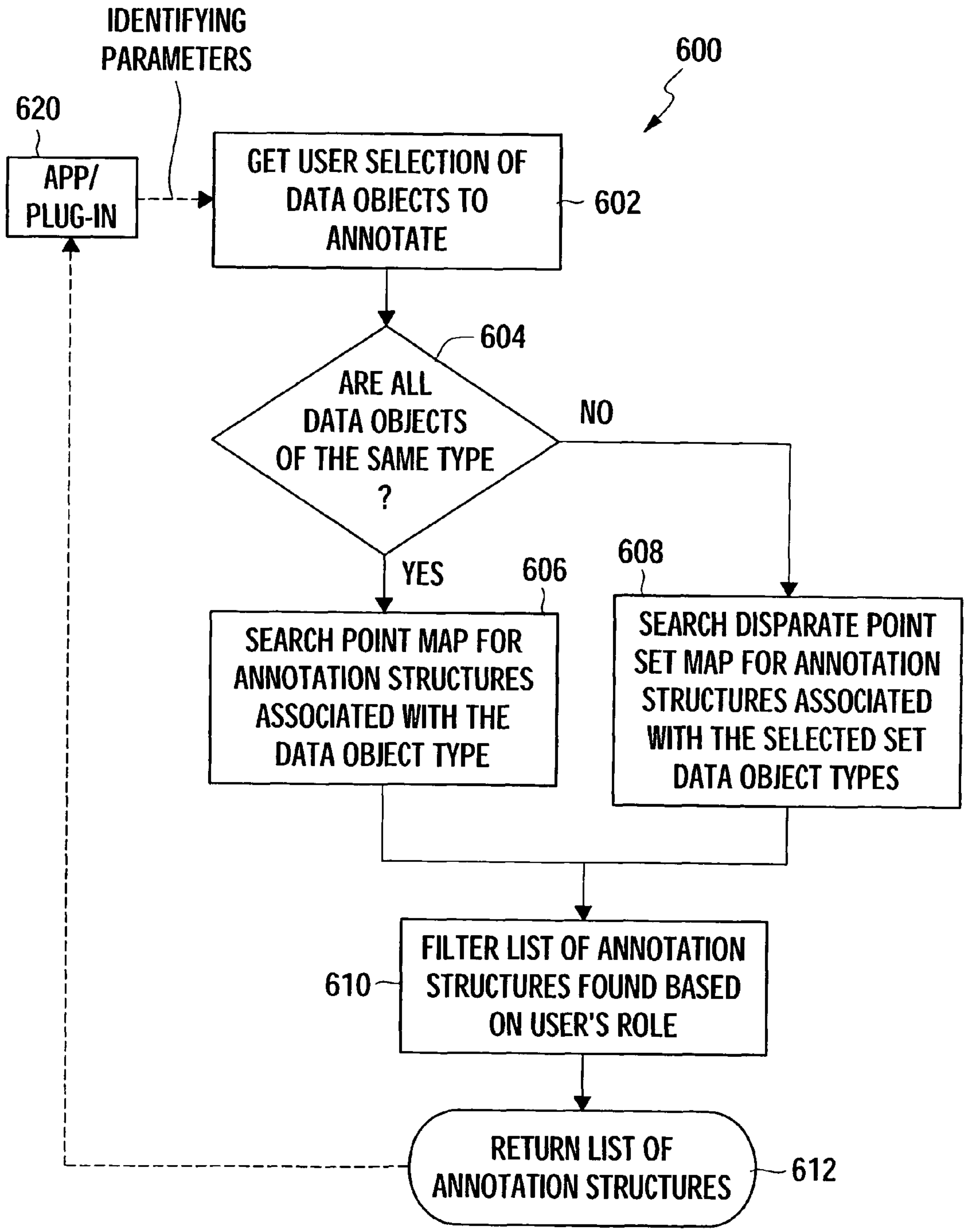

FIG. 6B illustrates exemplary operations 600 for selecting annotation structures that may be performed, for example, as part of step 504 shown in FIG. 6A, in response to a user request to annotate a set of selected data objects. The operations 600 begin, at step 602, by getting the user selection of data objects to annotate. For some embodiments, the operations 600 may be performed as part of an API function that returns a list of available annotation structures, given the selected data objects, which may be passed to the API function.

At step 604, a determination is made as to whether all of the selected data objects are of the same type. If so, annotation structures associated with the data type may be used to create annotation forms. As described above with reference to TABLE II, these annotation structures may be found by searching a point map for the data type, at step 606. On the other hand, if the data objects are not of the same type (i.e., disparate), annotation structures associated with the selected set of data object types may be found by searching a disparate point set map, at step 608.

Figure 6C:
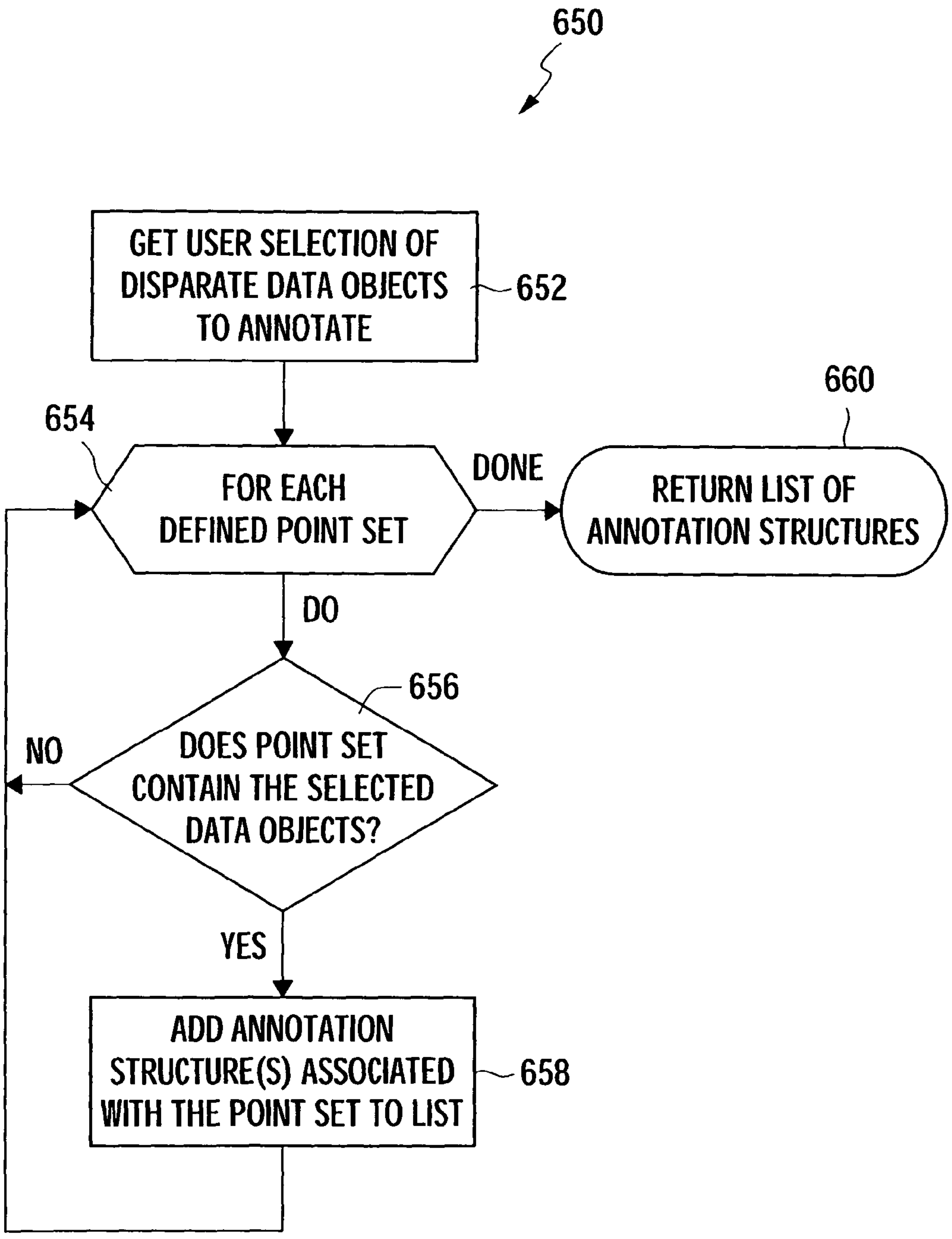

FIG. 6C illustrates exemplary operations 650 for searching a disparate point set map. At step 652, the user selection of disparate data objects is obtained. A loop of operations 654-658 is then performed for each defined point set in the disparate point set map. At step 656, a determination is made whether a current point set contains all the selected data objects. As described above, with reference to TABLE III, this determination may include checking to see if the number of selected objects of each type falls within a specified range. If so, the annotation structure(s) associated with the current point set are added to the list to be returned. Once disparate point map sets have been searched for each point set, a list of annotation structures found is returned, at step 660.

Referring again to FIG. 6B, regardless of whether the list of annotation structures is found by searching a point map or disparate point set map, the list is filtered, at step 610, based on the user role. In other words, the list of annotation structures found may be limited to only those to which the user has access. Of course, this filtering may alternatively be applied when searching the point maps or disparate point set maps. Further, it should be noted that, even if no role is specified for the user, default annotation structures associated with the selected data objects may be returned, in some cases. In any case, at step 612, the list of annotation structures is returned, for example, to a requesting application or plug-in 620.

As previously described, the list of annotation structures may simply be a list of one or more annotation structure IDs containing suitable information to locate the identified structures. The structure IDs may be used to retrieve the identified annotation structures, which may then be used to generate a GUI screen (i.e., an annotation form) for entering annotation information. Examples of such GUI forms are shown in FIGS. 8B and 8C.

EXEMPLARY APPLICATION EXAMPLES

Figure 8A:
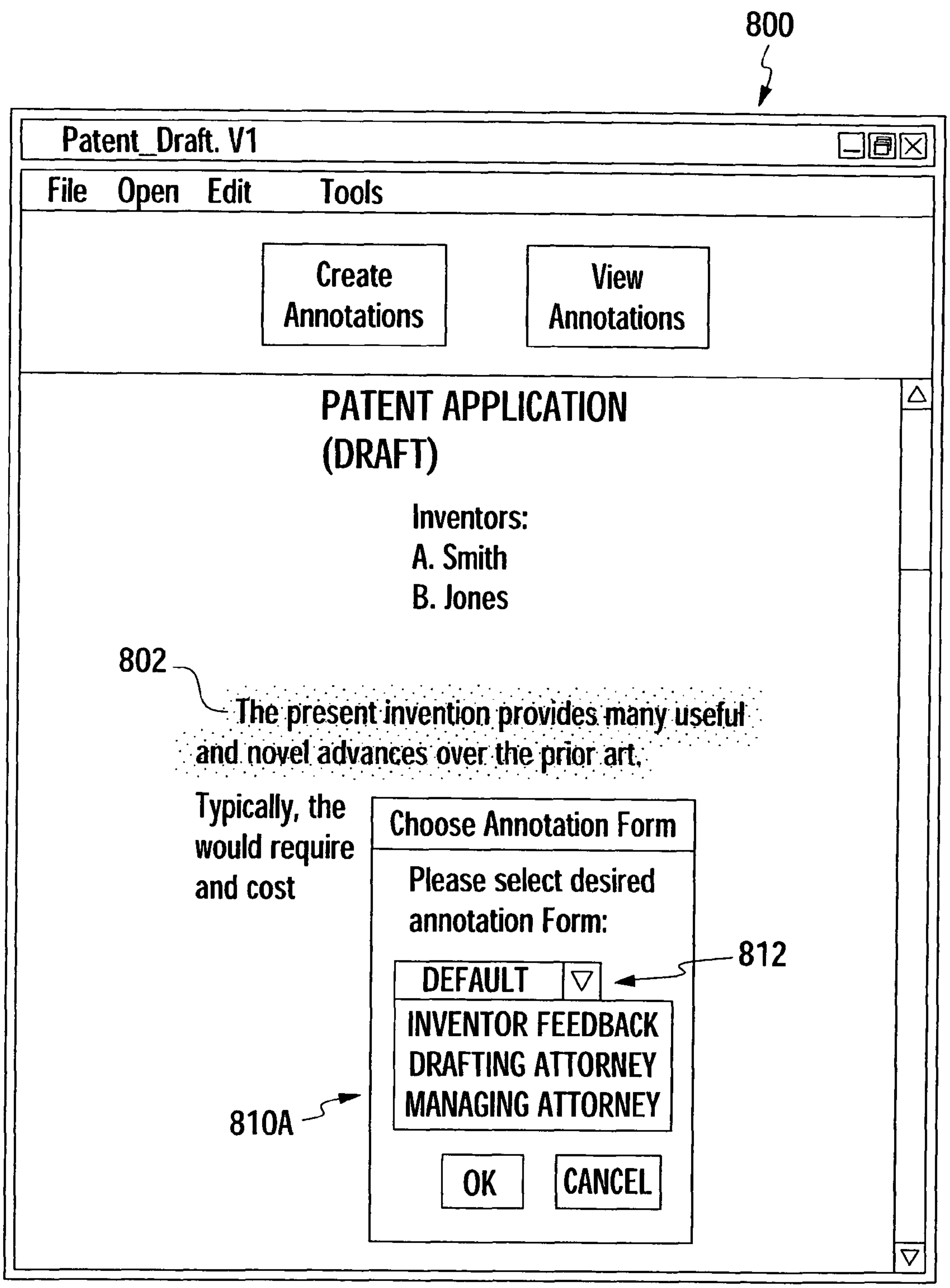
FIGS. 8A-8C are exemplary graphical user interface (GUI) screens for creating an annotation according to one embodiment of the present invention.
Figure 8B:
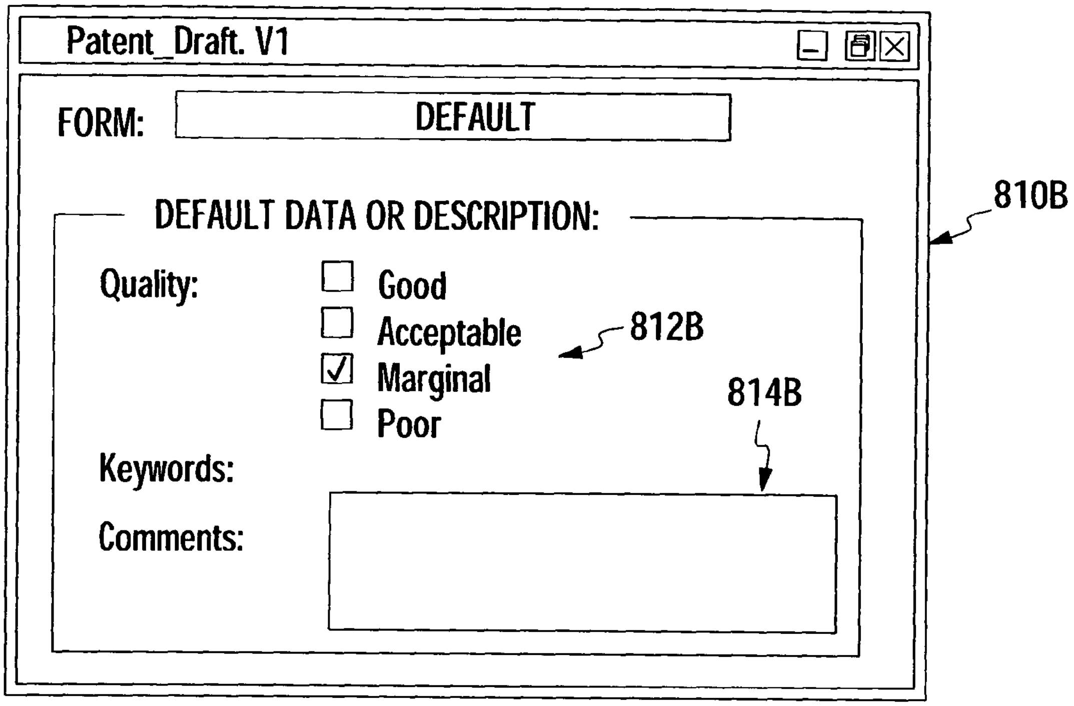
Figure 8C:
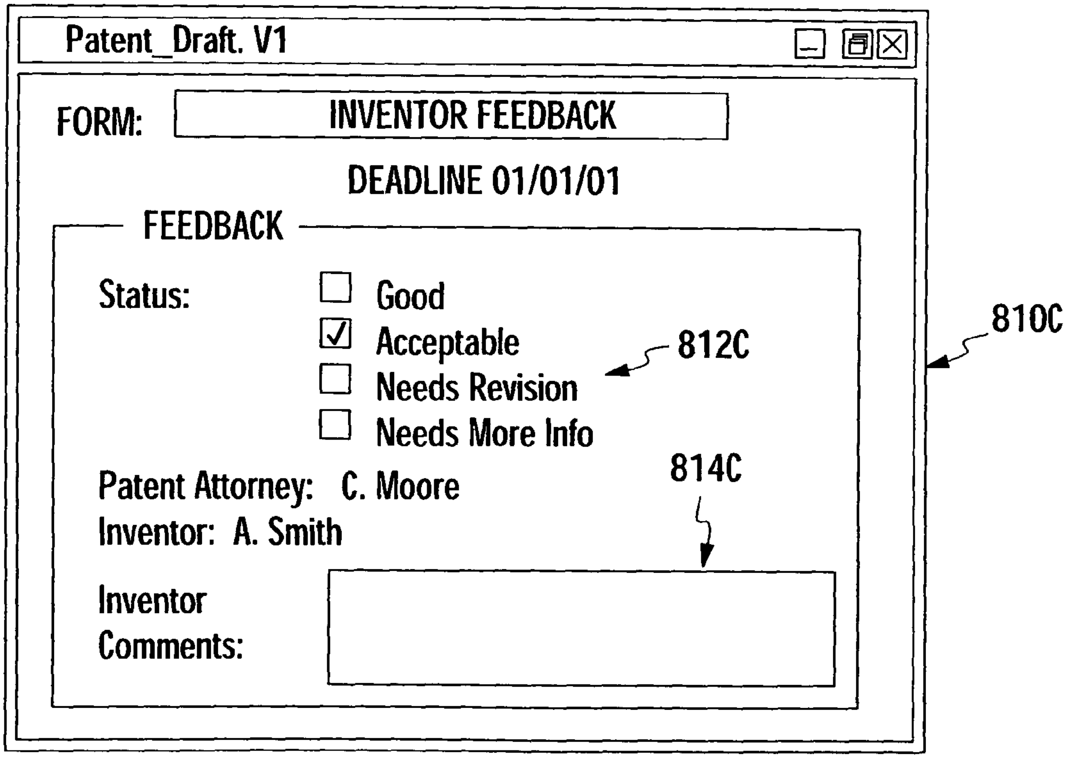

FIGS. 8A-8C are exemplary GUI screens that illustrate some concepts of the present invention applied to create and/or view annotations for different type data objects manipulated by various applications. Of course, details of the exemplary GUI screens shown in FIGS. 8A-8C are for illustrative purpose, and a wide variety of other type GUI screens providing similar functionality may also be utilized. FIG. 8A illustrates an exemplary screen 800 of a text editor used to edit a patent application. As shown, the screen 800 may include Create and View Annotations buttons 802 and 804 provided, for example, as part of an annotation plug-in for the text editor, allowing a user to create and view annotations.

In many cases, several different entities may collaborate to generate a patent application, including the inventors, a drafting attorney, and a managing attorney (e.g., the drafting attorney may be a hired "outside counsel" while the managing attorney may be "in-house counsel" for an entity for which the inventors work and to whom the patent application will be assigned). The inventors, drafting attorney, and managing attorney may all have different roles in collaborating on the patent application. For example, while the drafting attorney is charged with actually writing the application, the inventors are typically charged with reviewing the application to ensure that the description is technically correct, adequately describes, and enables their invention. The managing attorney, on the other hand, may also review the application, but with a slightly different focus, for example, to ensure the patent application provides the best (e.g., broadest) possible protection against competitors, often in light of other patents or applications in a patent portfolio. As such, annotations made by the different parties may different in order to capture different information.

Therefore, as described above, different type annotation forms (based on different annotation structures) may be provided to allow the capture of the different information. As previously described, for some cases, an annotation structure may be automatically selected, based on a number of parameters, such as the specified data object to be annotated, the role (or other credential) of a user, content/format of the annotated data, and the like. For example, a set of patent-specific forms may be presented based on a text search for the string "patent" in the title or other portion of the document. If there is more than one annotation structure corresponding to a given set of parameters (e.g., annotated data point and role of a user), the user may be presented with a choice of structures/forms from which to choose. Alternatively, some implementations may not perform automatic role checking and a user may be presented with a choice of all available annotations forms.

In either case, in response to submitting a request to create an annotation, the user may be presented with a list of annotation forms from which to choose in a GUI, such as the GUI 810$_A$ shown in FIG. 8A. As shown, the user may be able to select a desired annotation form from a pull down menu 812. Illustratively, four annotation forms are offered, a default form, an inventor feedback form, drafting attorney form, and managing attorney form (alternatively, any of these forms may be automatically selected, for example, based on the user's role).

FIG. 8B illustrates an exemplary default annotation form 810$_B$ that may be presented to the user, for example, in response to selecting the default form from the pull down menu 812. The default annotation form 810$_B$ may be generated, for example, by transforming a default annotation structure specifying a set of default annotation fields. As illustrated, the default annotation form 810$_B$ may contain generic quality check boxes 812$_B$ and a generic comment text box 814$_B$.

FIG. 8C illustrates an exemplary inventor feedback annotation form 810$_C$ that may be selected by the user, for example, via the pull down menu 812, or automatically based on the user's role. As illustrated, the inventor feedback annotation form 810$_C$ may have more specific check boxes 812$_C$ relating to the patent application process, an inventor comment text box 814$_C$, and may list the patent attorney and inventor by name. Optional other fields (not shown) may include a docket number, invention title, and other fields that may be useful to search.

Conclusion

Embodiments of the present invention facilitate the organization and selection of the annotation structures for use in generating forms for entering annotation information for a selected set of data objects to be annotated. By providing one or more configuration files that identify annotation structures associated with a given annotatable point-role set, appropriate annotation structures may be readily found through relatively simple searching techniques.

While the foregoing is directed to embodiments of the present invention, other and further embodiments of the invention may be devised without departing from the basic scope thereof, and the scope thereof is determined by the claims that follow.

What is claimed is:

1. A method for annotating a set of disparate data points, comprising:

receiving a request from a user to create an annotation for a specified set of disparate data points from different data sources;

determining if the disparate data points are of the same type;

if so, retrieving, from a configuration file, at least one annotation structure associated with the same type as the data points; and generating, based on the annotation structure, an interface for entering annotation information to be associated with the specified set of data points.

2. The method of claim 1, further comprising, if the data points are of differing types, retrieving, from a configuration file, at least one annotation structure associated with a set of data points of the same differing types.

3. The method of claim 2, wherein retrieving the one or more annotation structures associated with the set of data points of the same differing types, comprises:

determining, for each differing type, if a number of data points in the specified set having that type falls within a range specified in the configuration file; and if so, retrieving an identification of one or more annotation structures associated with the set of data points of the same differing types.

4. The method of claim 1, wherein retrieving the one or more annotation structures comprises retrieving only annotation structures associated with a specified role of the user.

* * * * *